United States Patent [19]

Hutchinson et al.

[11] 4,083,418

[45] Apr. 11, 1978

[54] BEAM WEIGHING SCALE FOR DIFFERENT WEIGHT UNITS

[75] Inventors: William Y. Hutchinson, Chicago; Walter P. Kushmuk, Niles, both of Ill.

[73] Assignee: Continental Scale Corporation, Bridgeview, Ill.

[21] Appl. No.: 783,418

[22] Filed: Mar. 31, 1977

Related U.S. Application Data

[63] Continuation-in-part of Ser. No. 722,411, Sep. 19, 1976, abandoned.

[51] Int. Cl.² ........................ G01G 1/36; G01G 23/14
[52] U.S. Cl. ...................................... 177/247; 177/173
[58] Field of Search ................ 177/246, 247, 250, 173

[56] References Cited

U.S. PATENT DOCUMENTS

| 203,902 | 5/1878 | Fairbanks | 177/246 X |
|---|---|---|---|
| 491,458 | 2/1893 | Woolley | 177/247 X |
| 3,506,078 | 4/1970 | Homs | 177/246 X |
| 3,574,321 | 4/1971 | Schoerer | 177/247 |

FOREIGN PATENT DOCUMENTS

| 959,617 | 6/1964 | United Kingdom | 177/247 |
|---|---|---|---|

*Primary Examiner*—George H. Miller, Jr.
*Attorney, Agent, or Firm*—Richard L. Johnston

[57] ABSTRACT

A beam weighing scale is provided wherein the index bars of the beam are rotatable so that different types of weight units can be displayed such as ounces and pounds, on the one hand, or grams and kilograms, on the other, or different values of the same weight units, for example, 0.1 pound and 0.25 pound. The sensitivity can also be altered by varying the center of gravity of the index bar and poise assembly.

12 Claims, 21 Drawing Figures

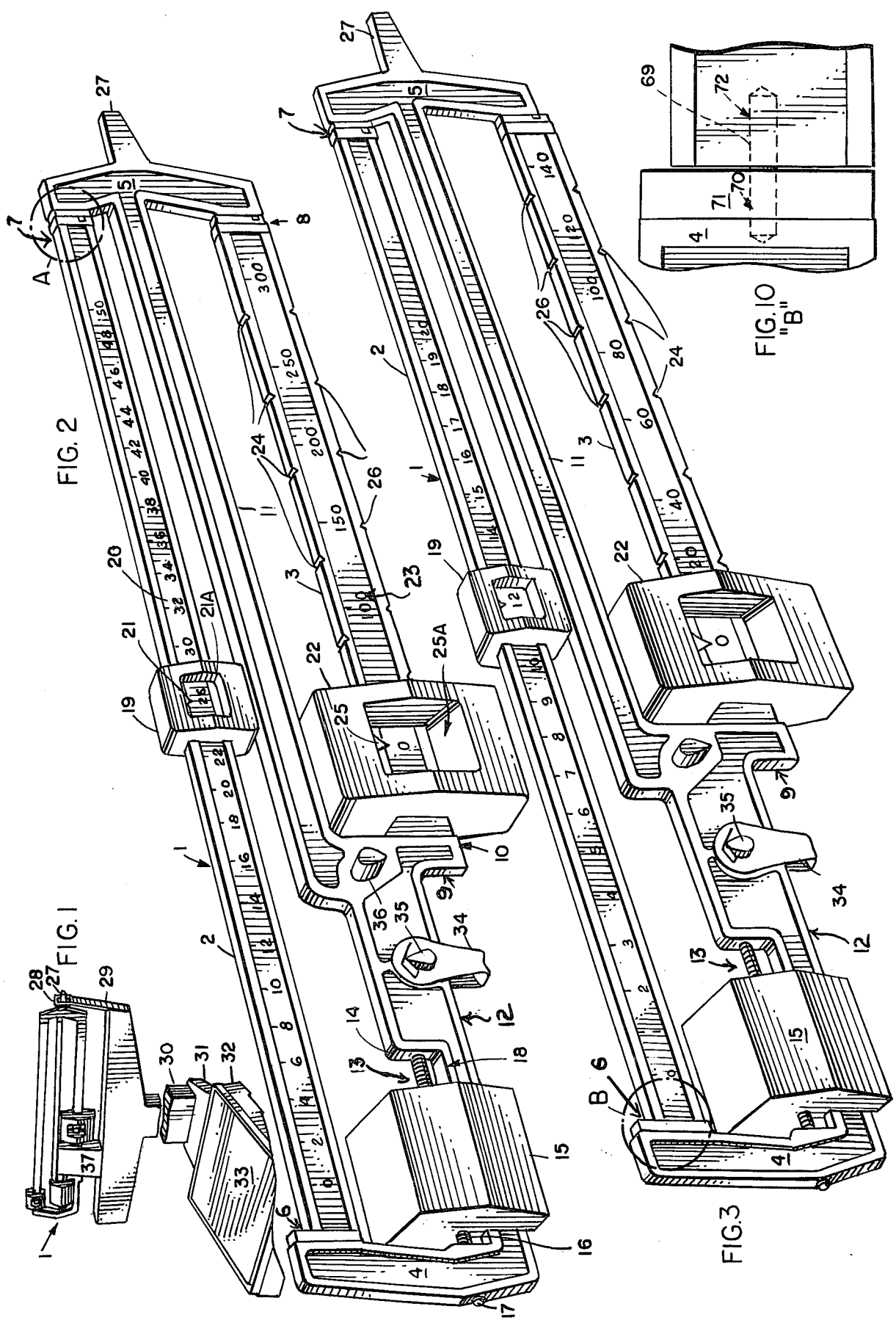

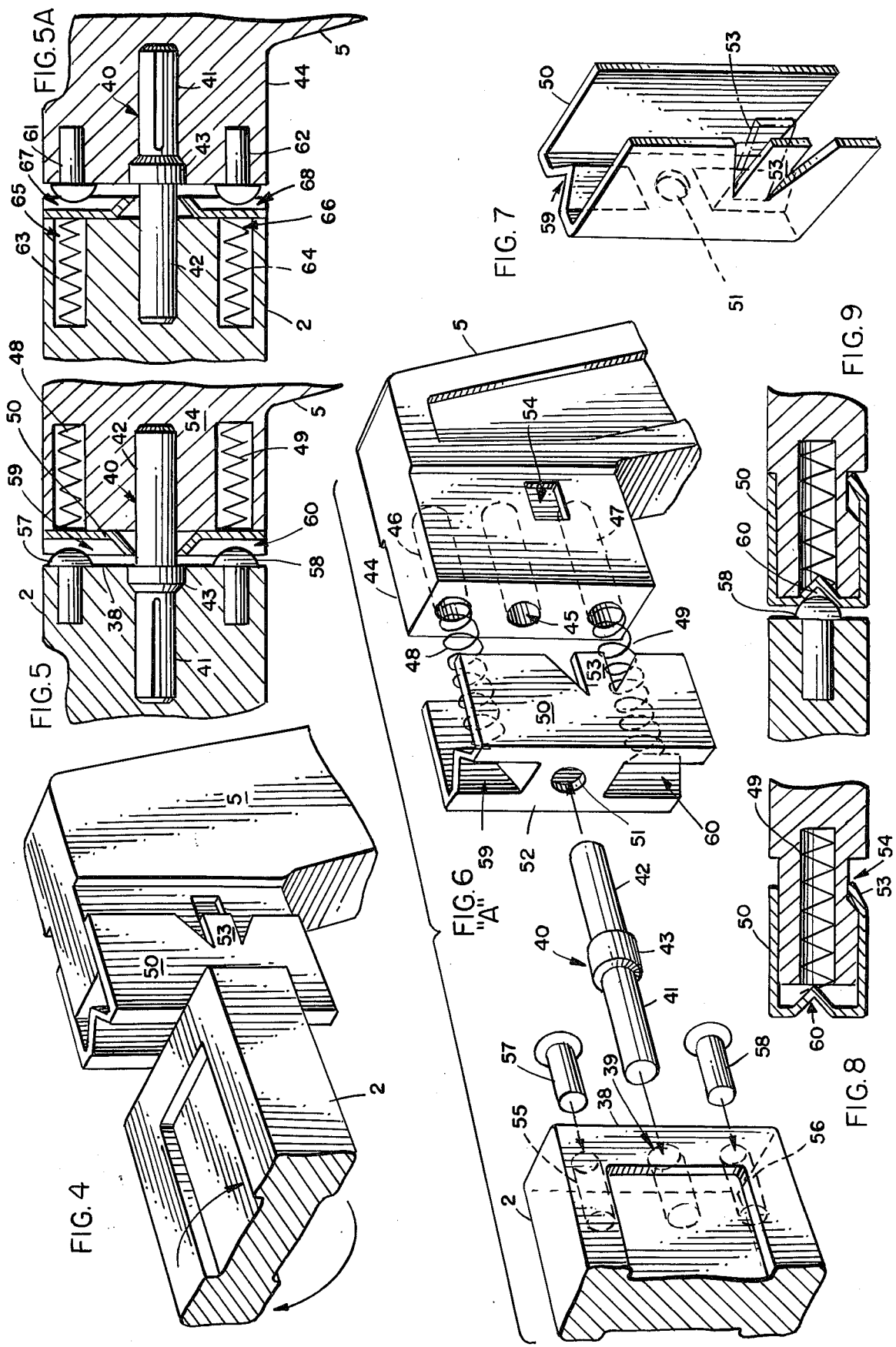

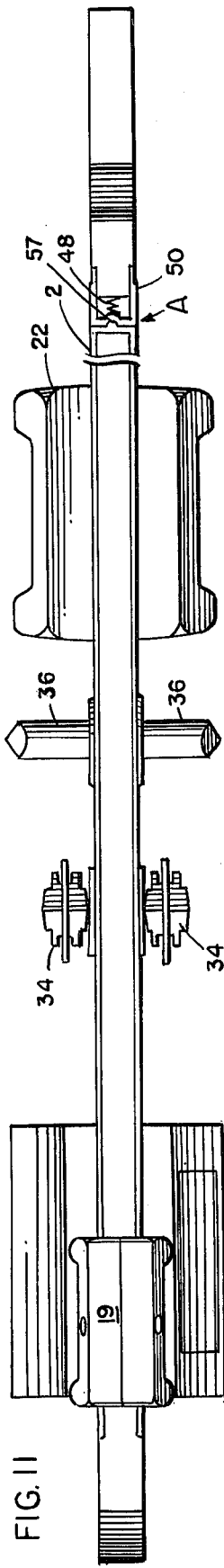
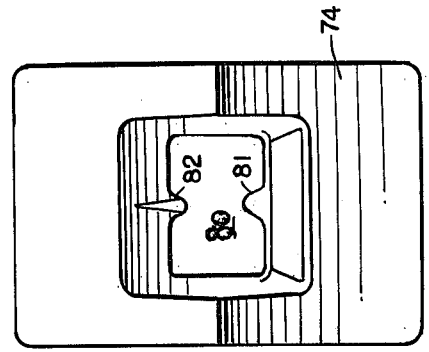
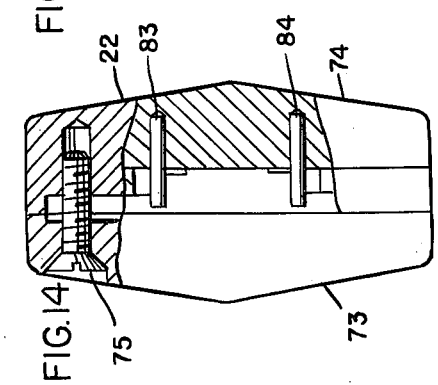
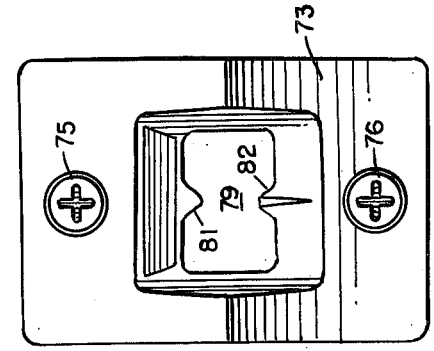
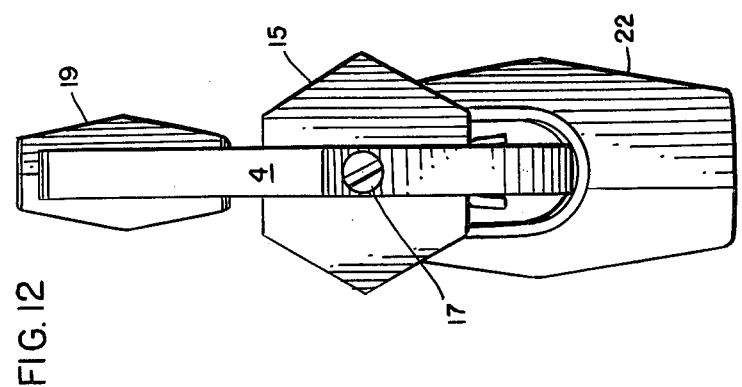
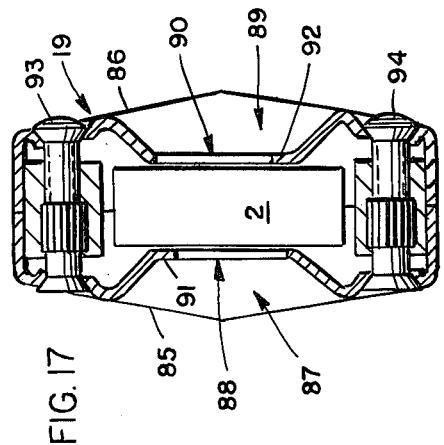
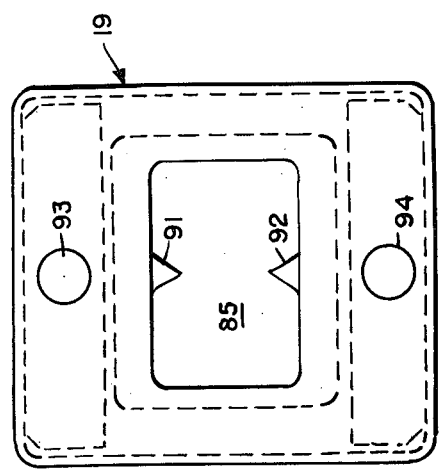

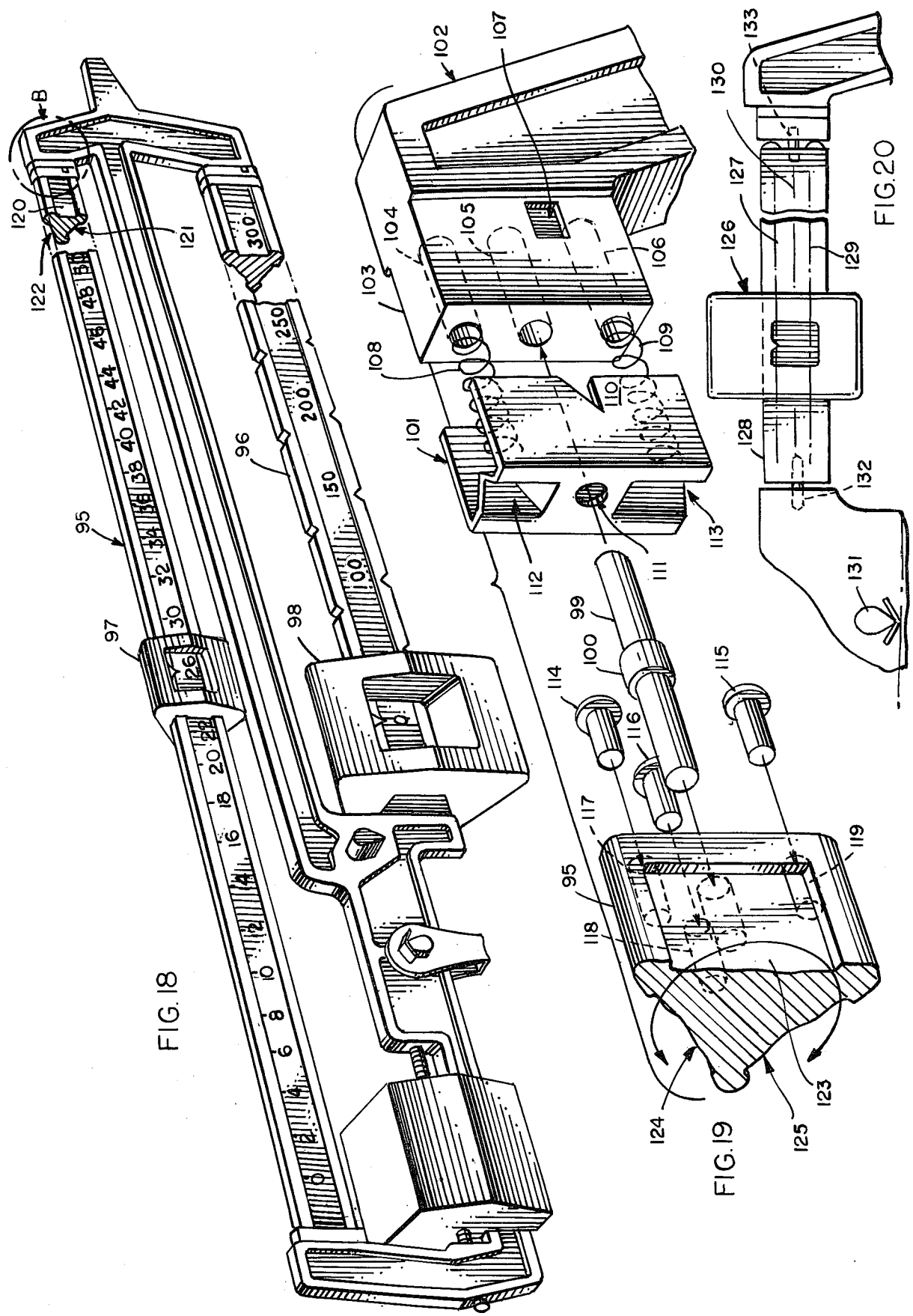

BEAM WEIGHING SCALE FOR DIFFERENT WEIGHT UNITS

RELATED APPLICATION

This application is a continuation-in-part of U.S. application Ser. No. 722,411, filed Sept. 19, 1976, now abandoned.

BACKGROUND

Inasmuch as different countries use different systems of weight units, there is a need in the manufacture of weighing scales to provide a scale in which alternative systems of weight units can be displayed such as, for example, ounces and pounds under the English weight unit system, or grams and kilograms under the metric system.

In a conventional beam scale such as is used for weighing people or other objects, including clinical scales, chair scales, scales used in physicians offices, personal beam scales, as well as beam scales used in weighing objects, the conventional types of scale have index bars on which poise weights are slidably mounted with the weight units displayed on the front of the bar, the beam being balanced on a fulcrum pivot and having a power pivot responsive to weight on a weighing platform. The slider is moved on the index bar until the beam is in balance. Usually, for weights up to 350 pounds there are two index bars, one above the other, the top bar carrying a small poise weight slider and the lower bar carrying a large poise weight slider. The weight readings on the upper bar may go as high as 50 pounds while the weight readings on the lower bar may go from 50 pounds to 350 pounds. It is not very practical to display different types of weight units such as weight units in the English system and weight units in the metric system so that the user can move the poise weights to the proper position for determining weight in two different types of weight units.

One system has been suggested whereby English weight units are exhibited on the front of the index bars and metric are exhibited on the back of the index bars but this is not very practical because in many cases weighing scales are placed against walls or in out-of-they way places where they cannot be viewed and operated from the rear. Furthermore, a user standing on the scale from the front where the scale exhibits weight in English units on the front of the index bars and in metric units on the back of the bars would have to move the poise weights until the beam balances and then determine the weight in metric units by stepping off of the weighing platform and going to the rear of the scale. This system also requires that the notches which normally are placed on the top of the index bar at predetermined positions corresponding to rather large weights in the case of say 50 pounds, 100 pounds, 150 pounds, etc., also be provided in different denominations and different locations for the metric system.

OBJECTS

One of the objects of the present invention is to provide a new and improved type of beam for use in a beam weighing scale and a new and improved beam weighing scale in which the index bar or bars are mounted for rotation in the beam frame whereby one type of weight unit in proper sequence is given on one side of the bar and another type of weight unit in proper sequence is given on the other side of the bar, and when the bar is rotated the second type of weight unit can be read directly by the user.

Another object of the invention is to provide a beam for a beam weighing scale and a beam weighing scale structure wherein the beam frame will support one or more rotatable index bars including, for example, a small poise bar mounted on the upper part of the beam frame and a large poise bar mounted on a lower part of the beam frame with an intermediate elongated frame member rigidly connecting a pair of end members so as to provide sufficient support for both index bars.

A further object of the invention is to provide a beam weighing scale with rotatable index bars which are connected to the beam frame by pivot members mounted in the beam frame and in the ends of the index bars.

An additional object of the invention is to provide a beam weighing scale of the type described having upper members mounted in the ends of the index bars and also in the beam frame wherein the mounting means is such that the index bars can be readily inserted in the manufacture of the beam and the structure is such that after insertion the index bars cannot be readily removed.

Still a further object of the invention is to provide a beam scale structure of the type described having rotatable index bars wherein the rotation can be limited to a predetermined position such as 180° by a detent structure.

Other objects and advantages of the invention will appear from the following description in conjunction with the accompanying drawings.

THE DRAWINGS

In the drawings:

FIG. 1 is a perspective view, with parts broken away, of one embodiment of a beam scale provided in accordance with the invention;

FIG. 2 is an enlarged perspective view of the beam of the beam scale shown in FIG. 1 with an index bar displaying weight in pounds from 0–50 pounds and a lower index bar displaying weight in pounds from 0–300 pounds;

FIG. 3 is a perspective view of the beam shown in FIG. 2 with the upper and lower bars rotated through an arc of 180° and with the upper beam displaying weight in kilograms from 0–30 kilograms and the lower beam displaying weight in kilograms from 0–140 kilograms;

FIG. 4 is a perspective view of a portion of the top index bar illustrated in FIGS. 2 and 3 showing the manner in which it rotates;

FIG. 5 is a sectional view illustrating one form of structure for use in rotating the index bar;

FIG. 5A is a sectional view illustrating another form of structure for use in rotating the index bar;

FIG. 6 is a view of one type of structure for rotating the index bar which is an enlargement of the portion of the beam shown by A in FIG. 2 showing the components before assembly;

FIG. 7 is a perspective view of a detail of a portion of the means for mounting the index bars for rotation and providing a detent to hold them in a predetermined position;

FIG. 8 is a cross sectional plan view of an assembled detent mechanism;

FIG. 9 is a cross sectional plan view illustrating the cooperation between the index bar and the detent mechanism after the components illustrated in FIG. 6 have been assembled;

FIG. 10 is an elevational view, with parts broken away, and with the components enlarged which corresponds to the area shown at B in FIG. 3;

FIG. 11 is a top plan view of the beam of the beam scale illustrated in FIGS. 2 and 3;

FIG. 12 is an end view of the beam of the beam scale illustrated in FIGS. 2 and 3 when viewed from the left hand side;

FIG. 13 is a front view of the large poise weight mounted on the lower index bar of the beam in FIGS. 2 and 3;

FIG. 14 is a vertical sectional view of the large poise weight shown in FIG. 13;

FIG. 15 is a back view of the large poise weight shown in FIG. 13;

FIG. 16 is an elevational front view of the small poise weight shown in FIGS. 2 and 3;

FIG. 17 is a vertical sectional view of the small poise weight shown in FIG. 16;

FIG. 18 is a perspective view with parts broken away and partly in section of another embodiment of the invention;

FIG. 19 is a perspective enlarged exploded view with parts broken away and partly in section illustrating components of the encircled portion B in FIG. 18 before assembly; and FIG. 20 is a side elevation view with parts broken away illustrating another embodiment of the invention wherein the sensitivity of the rotatable index bar and poise assembly is varied by varying the center of gravity.

BRIEF SUMMARY OF THE INVENTION

In accordance with the invention a beam type weighing scale is provided having a beam frame balanced on a fulcrum pivot and having a power pivot responsive to weight on a weighing platform together with one or more index bars carrying a slider weight mounted on said frame wherein said index bar or bars are rotatable and contain different types of weight units in proper sequence on two or more sides thereof, the weight units on one side being displayed or positioned with respect to the weight units on another side whereby when said bar is rotated a predetermined amount a different type or value of weight units in proper sequence appears right side up to the viewer of the scale.

One or both index bars can have two, three, four, five or six sides or any practical number of sides with different weight units, e.g., ounces, pounds, grams and kilograms displayed on different sides, or different values of the same units, e.g., 0.1 pound and 0.2 pound, or 0.1 kilogram and 0.2 kilogram displayed on different sides. Thus it is possible to have an English system of weighing units on one side of the index bar or bars and metric weighing units on the opposite side, and the user can rotate the index bar or bars to weigh a person or object and observe the weight in either type of weighing units from the front of the scale.

DETAILED DESCRIPTION OF THE INVENTION

In a conventional beam type weighing scale having two index bars mounted on a balance beam, the index bars are mounted rigidly or solid with respect to the beam so the beam can be constructed with a small poise index bat at the top of the frame extending across and rigidly secured at either end to vertically disposed end members and with the large poise index bar parallel to and below the small poise index bar extending across and rigidly connected to the lower parts of the frame.

In the practice of the present invention, as shown in the drawings, the beam generally shown at 1 comprises a small poise index bar 2 and a large poise index bar 3. The small poise index bar 2 is pivotally mounted to end members 4 and 5 of the frame at 6 and 7. The large poise index bar 3 is pivotally mounted to the lower part of end member 5 at 8 and to a downwardly extending portion 9 of the frame at point 10.

Because the index bars 2 and 3 are pivotally mounted, they do not provide a sufficient amount of beam rigidity and the beam frame therefore is constructed with an intermediate longitudinally extending elongated member 11 which is integrally formed either by casting, molding or otherwise, with the end members 4 and 5 and with an intermediate portion 12.

The intermediate portion 12 which extends between the end member 4 and the downwardly extending portion 9 has a recessed area 13 with a vertical side 14 adapted to receive a balance weight 15 mounted on a threaded rod 16 having a head 17. The weight 15 is internally threaded and is adapted to slide on the supporting area 18 by turning the head 17 of threaded rod 16 so as to provide a zero balance to offset the weight of the beam and the slider weights in their zero positions.

A small poise slider weight 19 is mounted on the upper index bar 2 which contains a scale generally indicated at 20, in the case of FIG. 2, showing weight units according to the English system from 0 to 50 pounds. Small poise weight 19 also contains a pointer indicator 21 which is visible through opening or window 21A to facilitate accurate reading of the scale in any predetermined position.

A large poise slider weight 22 is mounted on the lower index bar 3 which contains on the front side thereof weighing units 23 in the English system reading from 0 to 300 pounds. The index bar 3 is provided with notches 24 adapted to act as detents to receive a index pin in large poise weight 22 as more fully hereinafter described so that the large poise weight 22 will maintain a given position corresponding to one of the larger weight designations shown on the front of the index bar. A pointer 25 is positioned in the opening 25A of large poise slider weight 22 to facilitate positioning of the weight. The index bar 3 contains notches 26 on the bottom thereof which are spaced at different intervals from the notches 24 due to the fact that they correspond to a different set of weight units.

The large poise index weight 22 contains index pins as hereinafter described which are adapted to be received by the notches 24 and 26 so as to act as detents and permit moving large poise weight 22 to predetermined set positions in which the pointer 25 will be opposite the numbers or weighing units on the index bar. Inasmuch as the index pins in large poise member 22 are offset from pointer 25, the notches 24 and 26 are not directly opposite the weight units. For example, in a specific structure where English weight units are shown on one side of the large poise index bar from 0 to 300 pounds, the notches which receive the index pins of the large poise slider weight may be seven in number starting with the first notch to the left of the zero weight position in pounds with six additional notches spaced a distance of 1.183 inches apart over a total distance of 7.098 inches, the first notch being spaced a distance of approximately ¼ inch from the left hand of the index bar. The zero is spaced 59/64 inches from the end of the index bar and the units in 50 pound increments are spaced 1-3/16 inches up to 300 pounds over a total distance of 7-3/32 inches. On the reverse side of the bar which shows metric units as kilograms, the first notch with the weight units in the upright position is placed directly opposite the first notch on the opposite side of the bar but seven additional notches are provided spaced 1.043 inches apart over a total length of 7.301 inches. The numerals on the index bar are spaced apart 1-3/64 inches for each 20 kilograms to a final reading of 140 kilograms over a total distance of 7-19/64 inches.

The rigid intermediate member contains a projecting portion 27 of a conventional type adapted to move up and down in an opening 28 as illustrated in FIG. 1, the opening 28 being formed in a stationary frame member 29 which is conventional. The stationary frame member 29 is mounted on a hollow post 30 which in turn is mounted on a base 31 that extends from the platform base 32. The weighing platform 33 is conventional. The weighing mechanism which is actuated by placing a weight on the platform 33 is also conventional and is connected by conventional means extending through hollow post or column 30 to strap 34 which is mounted on power pivot 35. The entire beam 1 is balanced on fulcrum 36 which is mounted on a bearing in stationary portion 37 in a conventional way which does not form a part of this invention.

The means for pivoting the small poise index bar 2 which corresponds to the encircled area of FIG. 2 is illustrated in the exploded view FIG. 6 wherein the end 38 of the index bar 2 contains a bore 39 which receives a pivot pin 40 having an end 41 that fits into bore 39 with sufficient clearance to permit rotation and an end 42 with an intermediate collar 43 which acts as a stop member. The end 5 of frame 1 has integrally formed or cast thereon an inwardly projecting portion 44 which has a bore 45 and two bores 46 and 47 on opposite sides of bore 45. Bores 46 and 47 are adapted to receive springs 48 and 49, respectively, which engage the inner side of a sleeve member 50. The end 42 of pivot pin 40 is passed through the opening 51 in the front 52 of member 50 and is seated in the bore 45 against the outward pressure of springs 48 and 49. In order to hold the sleeve member 50 in place after it has been assembled with the pivot pin 40 and the springs 48 and 49, one side of sleeve member 50 is provided with a cut-out portion containing a finger 53 which is bent over and inserted in opening 54 in projecting portion 44 of the end member 5.

The end 38 of index bar 2 also contains two bores 55 and 56 into which round headed pins 57 and 58 are inserted. These pins when the pivot means is assembled will seat in reentrant areas 59 and 60 in the face 52 of sleeve 50 and thereby act as detents to hold the index bar 2 in place when it is rotated through an angle of 180°.

The relationship of the various elements after assembly is shown in FIG. 5 wherein the round heads of pins 57 and 58 are seated in the reentrant areas 59 and 60 and the sleeve 50 is pressed toward the end 38 of index bar 2 by means of springs 48 and 49.

An alternative means for permitting rotation of the index bar 2 is shown in FIG. 5A in which the positions of the various elements are reversed. The round headed pins 61 and 62 are inserted into bores in the fixed end 44 of the frame. The pivot pin 40 is seated in the fixed end 44 in the opposite position to that shown in FIG. 5. The springs 63 and 64 are seated in bores 65 and 66 in index bar 2. The reentrant portions 67 and 68 which receive the round heads of pins 61 and 62 are formed in the end of index bar 2 so that the engagement of the heads of the pins 61 and 62 in the reentrant portions 67 and 68 acts as a detent when index bar 2 is rotated through an angle of 180°.

FIG. 4 illustrates the manner in which index bar 2 is rotated with respect to the end member 5 of the beam frame.

FIG. 7 is a perspective view of sleeve member 50, the construction of which is the same, regardless of whether it is used in the assembly shown in FIG. 5 or the assembly shown in FIG. 5A.

FIG. 8 illustrates the manner in which the sleeve member 50 is positioned with respect to inwardly projecting member 44 whereby the portion 53 is bent inwardly into opening 54 so that once the index bar has been assembled with the pivoting means on the beam frame, it cannot be accidently dislodged.

FIG. 9 shows the relative positions of the detent pin 58 with respect to the reentrant portion 60 in FIG. 5 when viewed in transverse cross section.

The opposite end of the rotatable index bar 2 which includes the area designated by the letter B in FIG. 3 is illustrated with enlargement in FIG. 10. This end does not require a detent mechanism and therefore the pivot shaft 69 is merely inserted in a bore 70 in projecting portion 71 of end 4 of the fixed beam frame. The opposite end of the pivot pin is inserted in a bore 72 in the end of index bar 2.

The means for providing rotation for the large poise index bar 3 is the same as that described with respect to the poise index bar 2. As viewed in FIGS. 2 and 3, the lefthand pivoting arrangement of the index bar 3 corresponds to the structure in the area B of index bar 2 and the righthand pivoting arrangement of the index bar 3 corresponds to the structure shown with respect to the area A in the index bar 2.

The top plan view shown in FIG. 11 illustrates the relative positions of the various components with the small poise slider 19 in its zero position above stationary balancing weight 15 and the large poise slider 22 also in its zero position adjacent fulcrum 36, the index bar 2 being broken away and the means for rotation being generally illustrated at A.

FIG. 12 is an end view showing the relative positions of the same components.

FIGS. 13 to 15 illustrate the structure of the large poise slider which consists of a two-part housing comprising shell members 73 and 74 which are held together by screws 75 and 76. The members 73 and 74 have reentrant areas 77 and 78 with openings 79 and 80 through which the weight units on the side of index bar 3 can be observed. The edges of the openings contain index tabs 81 and 82 which serve as indicators when the slider weight is moved along index bar 3. It will be noted from FIG. 15 that the index tabs 81 and 82 are reversed with respect to one another on the opposite sides of large poise slider 3 so that one of them is always pointing downward toward the index bar in the upright position, even when the bar is reversed by rotation through an angle of 180°.

The large poise slider 22 also contains index pins 83 and 84 which are spring pins adapted to engage the notches 24 and 26. In the large poise slider illustrated, the pins 83 and 84 are directly above one another and there is a substantial amount of play between the large poise slider 22 and the index bar 3. When the large poise slider 22 is in one position, the index pin 83 will engage the notches in the top of the bar in that particular position. When the large poise slider 22 is rotated through an angle of 180° the pin 84 will engage the notches on the opposite side of the bar which are then in the upright position. The notches in the bar 3 are offset with respect to one another due to the fact that different weight units are indicated on opposite sides of the index bar. As an alternative, the notches could be opposite one another in which case the index pins 83 and 84 would be off set with respect to the vertical in order to compensate for the difference between the two types of weight units.

A small poise slider 19 is constructed as illustrated in FIGS. 16 and 17 and consists of a front shell 85 and a back shell 86 which are indentical in structure. The front shell has a reentrant portion 87 with an opening 88 to view the weight units on the vertical side of index bar 2. The back shell has a reentrant portion 89 with an opening 90 to view the opposite side of index bar 2. The front shell also has an index tab 91 which acts as a pointer in order to align the small poise slider with the various weight units on the side of the index bar 2. The opposite side has an index tab 92 which serves the same purpose when the index bar 2 is rotated to its reverse position. The two shells 85 and 86 are held together by means of two screws or rivets 93 and 94. The small poise slider is adapted to fit fairly closely on the index bar 2 and in view of the smaller weight involved, does not require any index pins such as the index pins 83 and 84 in the large poise slider. Nor does the index bar 2 require the use of notches as in the case of the index bar 3.

In assembling the index bars on the beam frame, the pivot shafts 69 which are the same in both index bars 2 and 3, are inserted in their respective openings in the beam frame and in the bars themselves and the pivot shaft 40 is assembled in a fixed position, either in the end of the index bar as shown in FIG. 5, or in the projecting portion of the beam frame as shown in FIG. 5A. The sleeve member 50 is then assembled with its springs either in the projecting portion of the end of the beam frame as shown in FIG. 6 or in the end of the index bar and pressed inwardly until it clears sufficiently for the end of the pivot shaft to be inserted in the opening 51 in the front of the sleeve 50, whereupon the sleeve 50 can be released. However, once the assembly has been made, in order to prevent accidental removal of the pivot means, the finger 53 is bent inwardly as shown by the dotted lines in FIG. 7 so that the sleeve 50 cannot be disengaged without bending the finger 53 outwardly again.

In the embodiments shown in the drawings the collar 43 of the pivot shaft is embedded in either the end of the index bar or in the projecting portion of the beam frame and is splined so as to be fixed therein against rotation of the shaft while permitting rotation of the index bar. This type of structure is subject to variation, however, and if desired the shaft can also be rotatable.

Instead of 2-sided index bars as described in FIGS. 1-17 either or both of the rotatable index bars can be triangular, 4-sided, 5-sided, 6-sided, or more, with different weight units on each face. Moreover, the small poise bar need not have the same number of weight units and sides as the large poise bar. For example, the large poise bar can have two sides and two sets of notches for pounds and kilograms whereas the small poise bar can be triangular with one face graduated in 100 gram increments, a second face graduated in 0.25 pound increments, and a third face graduated in 0.2 pound increments. Alternatively, both the large poise index bar and the small poise index bar can have three or more sides. Other combinations of graduations and weight units can be used on both bars.

In the embodiment shown in FIG. 18 the small poise bar 95 and the large poise bar 96 are both triangular in cross section and hence have three faces. Therefore, the sliders 97 and 98 are also triangular in cross section as generally illustrated in FIG. 19. The pivot shaft 99 and the collar 100 are generally similar to the pivot shaft 40 and the collar 43 in FIG. 6. The sleeve member 101 is generally similar to the sleeve member 50. Likewise, the end 102 is generally similar to the end 5. The inwardly projecting portion 103 is generally similar to the inwardly projecting portion 44. The bores 104, 105, and 106 are generally similar to the bores 45, 46 and 47. The opening 107 is generally similar to opening 54. The springs 108 and 109 are generally similar to springs 48 and 49. The finger 110 is generally similar to finger 53. Opening 111 corresponds to opening 51. Re-entrant portions 112 and 113 correspond to re-entrant portions 59 and 60. However, instead of two pins corresponding to 57 and 58 there are three pins 114, 115 and 116 which are adapted to be received in holes 117, 118 and 119. Thus, the index bar has three faces 120, 121 and 122 each of which contains a weight unit scale and the slider correspondingly has three faces 123, 124 and 125.

In the foregoing embodiments the center of gravity of the rotatable index bars and poise assembly is on the axis of rotation thereby resulting in a constant sensitivity. However, in some cases it may be desirable to have the center of gravity above or below the axis of rotation. This is accomplished as shown in FIG. 20. by using a poise 126 which is heavier at the upper end than at the lower end so that the center of gravity is on line 127 and when the index bar 128 is rotated the center of gravity shifts to line 129. This applies, of course, to a 2-sided index bar where 180° rotation from that shown in FIG. 20 will change the center of gravity from line 127 to line 129, thereby decreasing the sensitivity because the center of gravity of the beam assembly in relation to the pivot axis 130 is lowered. In FIG. 20 the fulcrum 131 corresponds to fulcrum 36 in FIG. 2. It will be recognized that pivot pins 132 and 133 are generally similar to pivot pins previously described which are in the central axis of rotation.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In a weighing scale of the balance beam type wherein a beam frame, balanced on a fulcrum pivot and having a power pivot responsive to weight on a weighing platform, has a pair of index bars carrying a slider weight mounted on said frame, the improvement which comprises means for mounting such index bars for rotation on said frame, said index bars containing different types of weight units in proper sequence on two or more sides thereof, the weight units on one side being so displayed with respect to the weight units on another side whereby when said bar is rotated a predetermined amount a different type or value of weight units in proper sequence appears right side up to the viewer of the scale, said beam frame comprising a generally horizontal rigid elongated frame member rigidly interconnected with vertically disposed end members, said index bars being substantially parallel to said generally horizontal rigid elongated frame member and at right angles to said opposing vertically disposed end members, and the opposing ends of said index bars being operatively associated for rotation with respect to said opposing vertically disposed end members.

2. A weighing scale as claimed in claim 1 wherein the weighing units on at least one side of said index bar are English system weighing units and the weighing units on another side are metric weighing units.

3. A weighing scale as claimed in claim 1 wherein said beam frame comprises a pair of opposing vertically disposed end members and a generally horizontal rigid elongated frame member rigidly connecting said end members, and two rotatable index bars, one mounted on one side of said elongated frame member and the other mounted on the opposite side of said elongated frame member.

4. A weighing scale as claimed in claim 1 wherein said means for mounting said index bars comprises shafts extending outwardly and longitudinally from the ends of said index bars.

5. A weighing scale as claimed in claim 1 in which said means for mounting said index bars for rotation comprises a shaft interconnecting the ends of each said index bar and said frame, said shaft having an end mounted in a longitudinal opening in the end of said index bar and the opposite end mounted in a longitudinal opening in said frame.

6. A weighing scale as claimed in claim 1 wherein at least one of said index bars has two sides.

7. A weighing scale as claimed in claim 1 wherein at least one of said index bars has three sides.

8. A weighing scale as claimed in claim 1 wherein the center of gravity of at least one of said index bars is off center with respect to the center of rotation.

9. A weighing scale as claimed in claim 1 in which said means for mounting said index bar for rotation comprises detent means operatively associated between the ends of said bar and said frame permitting rotation of said bar but adapted to hold said bar in a predetermined position after it has been rotated.

10. A weighing scale as claimed in claim 9 in which said index bar has a pivot shaft mounted axially in the end thereof and said detent means comprises at least one pin extending longitudinally either from the end of said bar or from said beam frame and a spring pressed sleeve containing a recess to receive said pin, said sleeve being mounted on said shaft oppposite said pin either from said beam frame if the pin is on said bar or from said index bar if the pin is on the beam frame.

11. A weighing scale as claimed in claim 1, in which said index bar contains notches on the top and bottom thereof and said slider weight contains an upper and a lower index spring pin, the upper index spring pin being adapted to engage notches on the top of the bar in one position and the lower index spring pin being adapted to engage the opposite set of notches when the bar is rotated to another position.

12. A weighing scale as claimed in claim 11 in which said notches are offset vertically and said pins are vertically aligned.

* * * * *